United States Patent
Narita

(10) Patent No.: US 10,382,536 B2
(45) Date of Patent: Aug. 13, 2019

(54) DEVICE MANAGEMENT APPARATUS

(71) Applicant: RICOH COMPANY, LTD., Tokyo (JP)

(72) Inventor: Yoshihiro Narita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 362 days.

(21) Appl. No.: 14/962,423

(22) Filed: Dec. 8, 2015

(65) Prior Publication Data

US 2016/0173580 A1 Jun. 16, 2016

(30) Foreign Application Priority Data

Dec. 15, 2014 (JP) .................. 2014-253478

(51) Int. Cl.
*H04L 29/08* (2006.01)
*H04L 12/24* (2006.01)
(Continued)

(52) U.S. Cl.
CPC .......... *H04L 67/104* (2013.01); *H04L 41/069* (2013.01); *H04L 43/0817* (2013.01); *H04L 63/00* (2013.01); *H04L 67/10* (2013.01)

(58) Field of Classification Search
CPC ...... G06F 11/0733–079; G06F 11/2028–3048; G06F 3/1203–1291;
(Continued)

(56) References Cited

U.S. PATENT DOCUMENTS 7,627,660 B2 * 12/2009 Naitoh ............... G06Q 10/087
235/385
2009/0094604 A1 * 4/2009 Sakai .................. G06F 3/1204
718/1
(Continued)

FOREIGN PATENT DOCUMENTS

JP 2011-100283 5/2011
JP 2014-174838 9/2014

*Primary Examiner* — Wing F Chan
*Assistant Examiner* — Rajeshwari Krishnan
(74) *Attorney, Agent, or Firm* — Oblon, McClelland, Maier & Neustadt, L.L.P.

(57) ABSTRACT

A device management apparatus is configured by execution of one or more programs to (i) acquire, from an external apparatus, a status-change information record for a status change that has occurred in a status-changed device, and (ii) determine whether or not the acquired status-change information record is a status-change information record for a managed device managed by the device management apparatus. If it is determined that the acquired status-change information record is a status-change information record for a managed device managed by the device management apparatus, the device management apparatus (iii) transmits an instruction to such managed device to perform a response action to display a message, based on the status-change information record, or if it is determined that the acquired status-change information record is not a status-change information record for any of the managed devices managed by the device management apparatus, the device management apparatus transmits information based on the acquired status-change information record to another device management apparatus managing another device which is not one of the managed devices managed by the device management apparatus.

11 Claims, 9 Drawing Sheets

(51) Int. Cl.
*H04L 12/26* (2006.01)
*H04L 29/06* (2006.01)

(58) Field of Classification Search
CPC ....... H04L 41/0273–0893; H04L 41/12; H04L 41/22; H04L 41/5054–5061; H04L 67/025–0817; H04L 67/10–104
See application file for complete search history.

(56) References Cited

U.S. PATENT DOCUMENTS

| | | | | |
|---|---|---|---|---|
| 2010/0057904 A1* | 3/2010 | Nagamori | ........... | H04L 41/0273 709/224 |
| 2010/0169468 A1* | 7/2010 | Emori | ................ | H04L 41/5054 709/220 |
| 2011/0205580 A1* | 8/2011 | Nishiyama | ........... | G06F 3/1203 358/1.15 |
| 2012/0127524 A1* | 5/2012 | Hagiwara | ............. | G06F 3/1203 358/1.15 |
| 2012/0226791 A1* | 9/2012 | Ramaswamy | .......... | H04L 41/12 709/223 |
| 2012/0265865 A1* | 10/2012 | Tanaka | ................. | H04L 41/044 709/223 |
| 2012/0303779 A1* | 11/2012 | Lee | .................... | H04L 41/0893 709/223 |
| 2013/0036195 A1* | 2/2013 | Tanaka | ............... | H04L 41/5061 709/217 |
| 2013/0185461 A1* | 7/2013 | Narita | ................ | G06F 11/3051 710/15 |
| 2014/0108866 A1* | 4/2014 | Funane | ............... | H04L 43/0817 714/37 |
| 2014/0223315 A1* | 8/2014 | Hagiwara | ............... | H04L 41/22 715/736 |
| 2014/0258770 A1* | 9/2014 | Takami | ............... | G06F 11/0733 714/3 |
| 2015/0052384 A1* | 2/2015 | Kokubo | .............. | G06F 11/2028 714/4.11 |
| 2015/0142848 A1* | 5/2015 | Kawamura | ............... | G08G 1/04 707/770 |
| 2015/0304484 A1* | 10/2015 | Halmstad | .......... | H04M 1/72577 455/419 |
| 2015/0381546 A1* | 12/2015 | Mahadevan | .......... | H04L 67/025 709/207 |
| 2016/0173580 A1* | 6/2016 | Narita | ................... | H04L 67/104 709/205 |

\* cited by examiner

FIG.8

| DEVICE NAME | IP ADDRESS | PORT NUMBER | SERIAL NUMBER |
|---|---|---|---|
| DEVICE 1 | xxx.yyy.xxx.xx1 | 80 | A00000001 |
| DEVICE 2 | xxx.zzz.xxx.xx2 | 80 | A00000002 |

FIG.9

| DEVICE NAME | IP ADDRESS | PORT NUMBER | Servlet NAME |
|---|---|---|---|
| DEVICE 1 | xxx.xxx.xxx.xx1 | 80 | displayMessage |
| DEVICE 2 | xxx.zzz.xxx.xx2 | 80 | displayMessage |
| DEVICE 3 | xxx.xxx.xxx.xx3 | 80 | displayMessage |
| DEVICE 4 | xxx.yyy.xxx.xx1 | 80 | displayMessage |
| DEVICE 5 | xxx.zzz.xxx.xx2 | 80 | displayMessage |

FIG.10

| SERVER NAME | IP ADDRESS | PORT NUMBER | Servlet NAME |
|---|---|---|---|
| DEVICE MANAGEMENT 1 | xxx.xxx.xxx.xxx | 8080 | helpDeskMessage |
| DEVICE MANAGEMENT 2 | yyy.yyy.yyy.yyy | 8080 | helpDeskMessage |

| DEVICE NAME | IP ADDRESS | PORT NUMBER | Servlet NAME |
|---|---|---|---|
| DEVICE 4 | xxx.yyy.xxx.xx1 | 80 | displayMessage |
| DEVICE 5 | xxx.zzz.xxx.xx2 | 80 | displayMessage |

DEVICE MANAGEMENT APPARATUS

CROSS-REFERENCE TO RELATED APPLICATIONS

The present application claims priority to and incorporates by reference the entire contents of Japanese Patent Application No. 2014-253478 filed in Japan on Dec. 15, 2014.

BACKGROUND OF THE INVENTION

1. Field of the Invention

The present invention relates generally to device management apparatuses.

2. Description of the Related Art

A technique for establishing collaboration between a help desk system, which manages an event such as a trouble occurred in a device, and a device management apparatus, which manages the device, is conventionally known. An example of the technique is disclosed in Japanese Laid-open Patent Application No. 2014-174838.

Conceivable examples of the above-described technique include a technique of causing information about a device managed by a help desk system to be displayed on the device via a device management apparatus managing the device.

To implement this technique, the following approach can be taken. The help desk system transmits an electronic mail (hereinafter, "email") containing information about one of devices managed by the help desk system to an email server. The device management apparatus receives the email from the email server. If the information contained in the email is information about a device managed by the device management apparatus (hereinafter, "the managed device"), the device management apparatus causes the managed device to display the information. This approach requires that the email received by the device management apparatus from the email server should be deleted. This is because, if a same email should be received a plurality of times, the device management apparatus performs the above-described process the plurality of times, which is undesirable.

Accordingly, in a situation where there is a plurality of device management apparatuses managing different devices, if one of the device management apparatuses receives an email containing information about a device managed by another one of the device management apparatuses, the other one of the device management apparatuses cannot receive the email and therefore fails to cause the device to display the information about the device.

SUMMARY OF THE INVENTION

It is an object of the present invention to at least partially solve the problems in the conventional technology.

According to exemplary embodiments of the present invention, there is provided a device management apparatus comprising: an acquisition unit that acquires, from an external apparatus, a status-change information record about a status change occurred in a first device; a determining unit that determines whether or not the acquired status-change information record is a status-change information record about the first device; a response-action instructing unit that instructs, if the status-change information record is determined as being a status-change information record about the first device, the first device to perform a response action based on the status-change information record; and a transmitting unit that transmits, if the status-change information record is determined as not being about the first device, information based on the status-change information record to another device management apparatus managing a second device that is different from the first device.

Exemplary embodiments of the present invention also provide a device management apparatus comprising: a receiving unit that receives, from another device management apparatus, the other device management apparatus managing a second managed device that is different from the first managed device, information based on a status-change information record about a status change occurred in another device, than the second device; a determining unit that determines whether or not the received information contains information about the first device; and a response-action instructing unit that instructs, if the information contains information about the first device, the first device to perform a response action based on the information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating an example of information stored in a managed-device-identification-information storage unit according to the present embodiment;

FIG. 9 is a diagram illustrating an example of unprocessed-device information according to the present embodiment;

FIG. 10 is a diagram illustrating an example of information stored in a device-management-apparatus-identification-information storage unit according to the present embodiment;

DETAILED DESCRIPTION OF THE PREFERRED EMBODIMENTS

Exemplary embodiments of the present invention are described in detail below with reference to the accompanying drawings.

Figure 1:
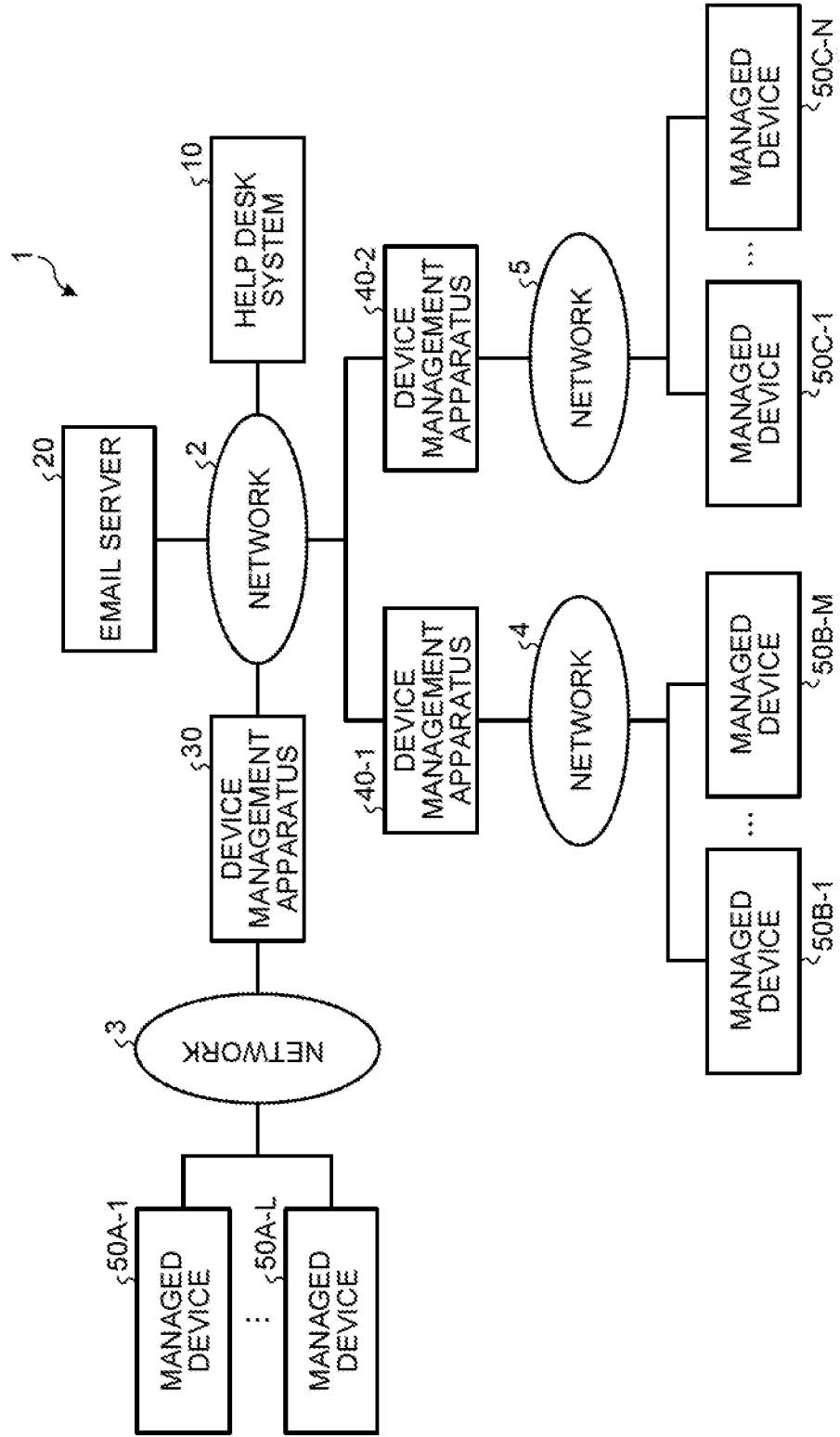
FIG. 1 is a block diagram illustrating an example of a configuration of a device management system according to an embodiment of the present invention.

FIG. 1 is a block diagram illustrating an example of configuration of a device management system 1 according to an embodiment. As illustrated in FIG. 1, the device management system 1 includes a help desk system 10, an email server 20, device management apparatuses 30, 40-1, and 40-2, managed devices 50A-1 to 50A-L (L is a natural number), 50B-1 to 50B-M (M is a natural number), and 50C-1 to 50C-N (N is a natural number).

The email server 20 is an example of "external apparatus". The device management apparatus 30 is an example of "first device management apparatus". The device management apparatuses 40-1, and 40-2 are an example of "second device management apparatus". The managed devices 50A-1 to 50A-L are an example of "first managed device". The managed devices 50B-1 to 50B-M and 50C-1 to 50C-N are an example of "second managed device".

The help desk system 10, the email server 20, and the device management apparatuses 30, 40-1, and 40-2 are connected to each other via a network 2. The device management apparatus 30 is connected to the managed devices 50A-1 to 50A-L via a network 3. The device management apparatus 40-1 is connected to the managed devices 50A-1 to 50A-L via a network 4. The device management apparatus 40-2 is connected to the managed devices 50C-1 to 50C-N via a network 5.

Examples of each of the networks 2 to 5 include the Internet and a LAN (local area network). The network 2 to 5 may be either networks identical to each other or different networks.

The help desk system 10 manages event information records, each about an event (which is an example of "status change") occurred in one of the managed devices 50A-1 to 50A-L, 50B-1 to 50B-M, and 50C-1 to 50C-N. The help desk system 10 can be implemented on one or more computers.

Each event information record (which is an example of "status-change information record") may contain, for example, description information indicating description of the event, a device identification information piece, by which the device where the event has occurred is identified, address information indicating a network address of the device where the event has occurred, and response action information indicating a response action to be taken for the event (the description of the event).

Examples of the event description include, but not limited to, statuses of a trouble such as occurrence of the trouble, a response action taken for the trouble, and closure of the trouble. The event can further include a status change occurred in the device. Examples of the device identification information piece include a device name, a serial number, and a MAC (media access control) address. Examples of the address information include an IP address and a port number. Examples of the response action information include a URL (uniform resource locator) such as a Servlet name, by which a program, which causes the device where the event has occurred to perform a predetermined operation, is called. Examples of the predetermined operation include an operation of causing the device to display a message, which depends on the event. The message to be displayed can be specified using the response action information.

Figure 2:
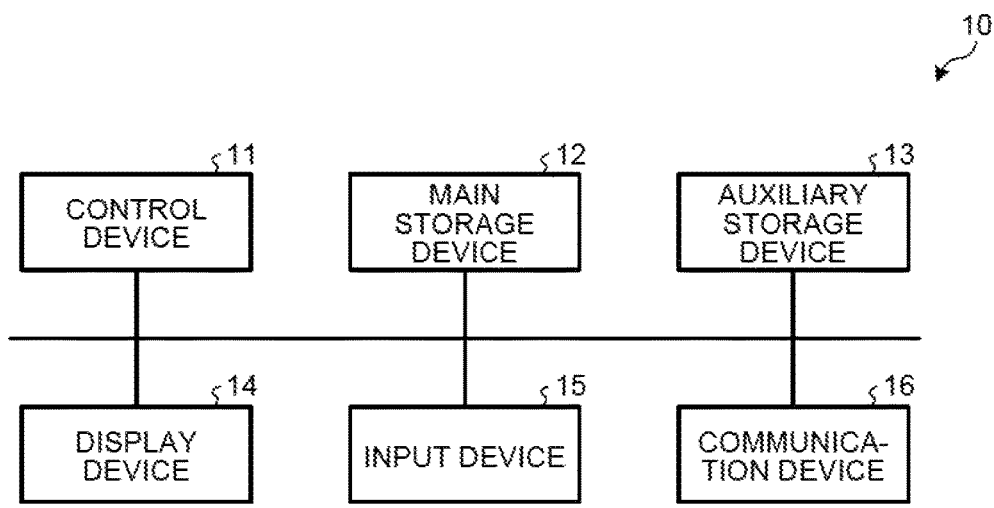
FIG. 2 is a block diagram illustrating an example of a hardware structure of a help desk system according to the present embodiment.

FIG. 2 is a block diagram illustrating an example of a hardware structure of the help desk system 10 according to the present embodiment. As illustrated in FIG. 2, the help desk system 10 includes a control device 11 such as a CPU (central processing unit) and a GPU (graphics processing unit), a main storage device 12 such as a ROM (read only memory) and a RAM (random access memory), an auxiliary storage device 13 such as an HDD (hard disk drive) or an SSD (solid state drive), a display device 14 such as a display, an input device 15 such as a mouse, a keyboard, or a touch panel, and a communication device 16 such as a communication interface. Hence, the help desk system 10 has a hardware structure exploiting a general computer.

For example, when a new event information record (e.g., an event information record about occurrence of a trouble) is entered by an operator of the help desk system 10 or the like by using the input device 15, the control device 11 registers (stores) the event information record in the auxiliary storage device 13 and transmits an email containing content of the event information record from the communication device 16 to the email server 20.

For another example, when an updating input, which updates an event information record (from occurrence of a trouble to a response action taken for the trouble, for example) already registered in the auxiliary storage device 13, is entered by an operator of the help desk system 10 or the like by using the input device 15, the control device 11 updates the event information record and transmits an email containing content of the updated event information record from the communication device 16 to the email server 20.

The email server 20 relays transmission and reception of emails and can be implemented on one or more computers.

Figure 3:
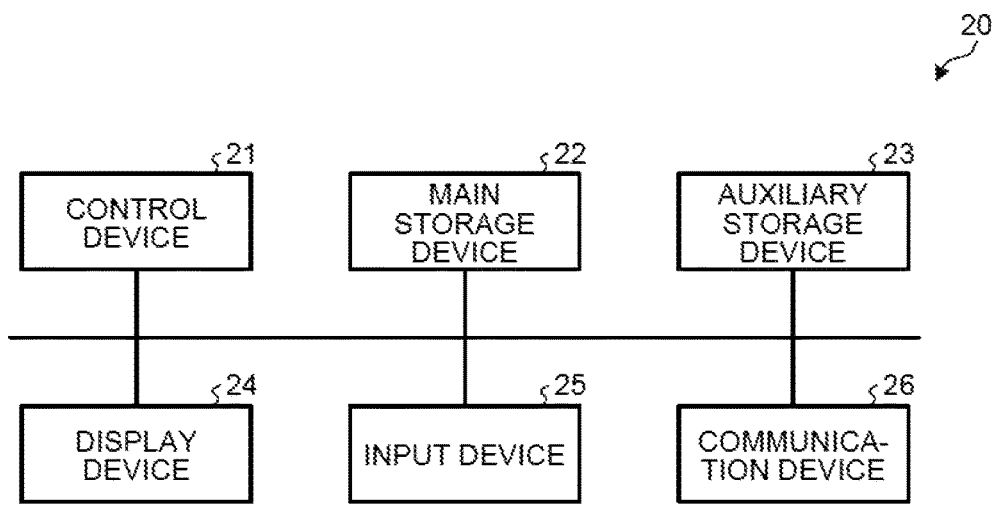
FIG. 3 is a block diagram illustrating an example of a hardware structure of an email server according to the present embodiment.

FIG. 3 is a block diagram illustrating an example of a hardware structure of the email server 20 according to the present embodiment. As illustrated in FIG. 3, the email server 20 includes a control device 21 such as a CPU and a GPU, a main storage device 22 such as a ROM and a RAM, an auxiliary storage device 23 such as an HDD or an SSD, a display device 24 such as a display, an input device 25 such as a mouse, a keyboard, or a touch panel, and a communication device 26 such as a communication interface. Hence, the email server 20 has a hardware structure exploiting a general computer.

For example, the control device 21 receives an email(s) from the help desk system 10 and accumulates (stores) the email(s) in the auxiliary storage device 23. For another example, upon receiving a transmission request and a deletion request from the device management apparatus 30, the control device 21 transmits the email(s) accumulated in the auxiliary storage device 23 to the device management apparatus 30 and deletes the email(s) transmitted to the device management apparatus 30 from the auxiliary storage device 23.

The device management apparatuses 30, 40-1, and 40-2 manage the managed devices 50A-1 to 50A-L, the managed devices 50B-1 to 50B-M, and the managed devices 50C-1 to 50C-N, respectively. Each of the device management apparatuses 30, 40-1, and 40-2 can be implemented on one or more computers.

The present embodiment is described by way of an example, in which the device management apparatus 30 functions as a master, while the device management apparatuses 40-1, and 40-2 function as slaves. However, the master-slave relation is not limited thereto. Hereinafter, the term "device management apparatus 40" may be used to denote one of the device management apparatuses 40-1 and 40-2 in a situation where it is unnecessary to distinguish therebetween. The present embodiment is described by way of the example, in which the number of the device management apparatuses 40 functioning as slaves is two. However, the number of the device management apparatuses 40 each functioning as a slave may be one, or three or more.

Figure 4:
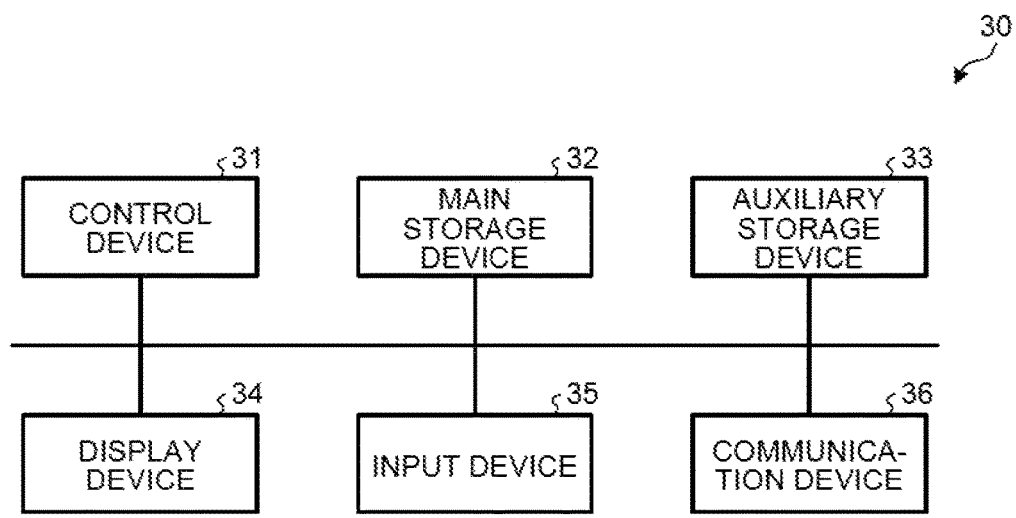
FIG. 4 is a block diagram illustrating an example of a hardware structure of a device management apparatus according to the present embodiment.

FIG. 4 is a block diagram illustrating an example of a hardware structure of the device management apparatus 30 according to the present embodiment. As illustrated in FIG. 4, the device management apparatus 30 includes a control device 31 such as a CPU and a GPU, a main storage device 32 such as a ROM and a RAM, an auxiliary storage device 33 such as an HDD or an SSD, a display device 34 such as a display, an input device 35 such as a mouse, a keyboard, or a touch panel, and a communication device 36 such as a communication interface. Hence, the device management apparatus 30 has a hardware structure exploiting a general computer.

Figure 5:
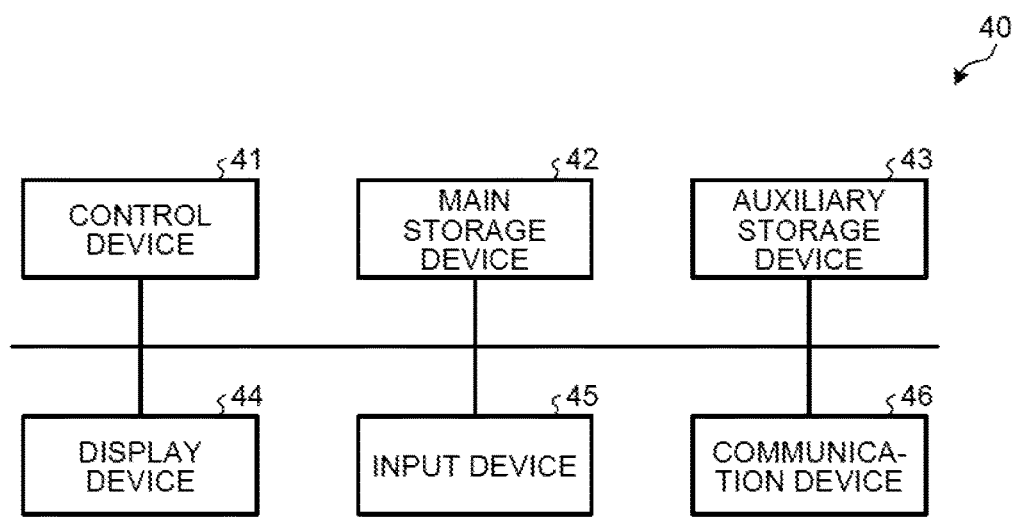
FIG. 5 is a block diagram illustrating an example of a hardware structure of another device management apparatus according to the present embodiment.

FIG. 5 is a block diagram illustrating an example of a hardware structure of the device management apparatus 40 according to the present embodiment. As illustrated in FIG. 5, the device management apparatus 40 includes a control device 41 such as a CPU and a GPU, a main storage device 42 such as a ROM and a RAM, an auxiliary storage device 43 such as an HDD or an SSD, a display device 44 such as a display, an input device 45 such as a mouse, a keyboard, or a touch panel, and a communication device 46 such as a communication interface. Hence, the device management apparatus 40 has a hardware structure exploiting a general computer.

Each of the managed devices 50A-1 to 50A-L, 50B-1 to 50B-M, and 50C-1 to 50C-N may be, for example, an image forming apparatus such as a printer, a copier, an MFP (multifunction peripheral), a scanner, or a facsimile, electronic equipment of various types such as a projector, a camera, an air conditioner, a refrigerator, a fluorescent lamp, a vending machine, or a portable hand-held terminal, or an information processing apparatus such as a PC or a tablet PC. The MFP is an apparatus having at least two functions of a copier function, a printer function, a scanner function, and a facsimile function.

Hereinafter, the term "managed device 50" may be used to denote one of the managed devices 50A-1 to 50A-L, 50B-1 to 50B-M, and 50C-1 to 50C-N in a situation were it is unnecessary to distinguish each of them. The term "managed device 50A" may be used to denote one of the managed devices 50A-1 to 50A-L in a situation where it is unnecessary to distinguish each of them. The term "managed device 50B" may be used to denote one of the managed devices 50B-1 to 50B-M in a situation where it is unnecessary to distinguish each of them. The term "managed device 50C" may be used to denote one of the managed devices 50C-1 to 50C-N in a situation where it is unnecessary to distinguish among them.

Figure 6:
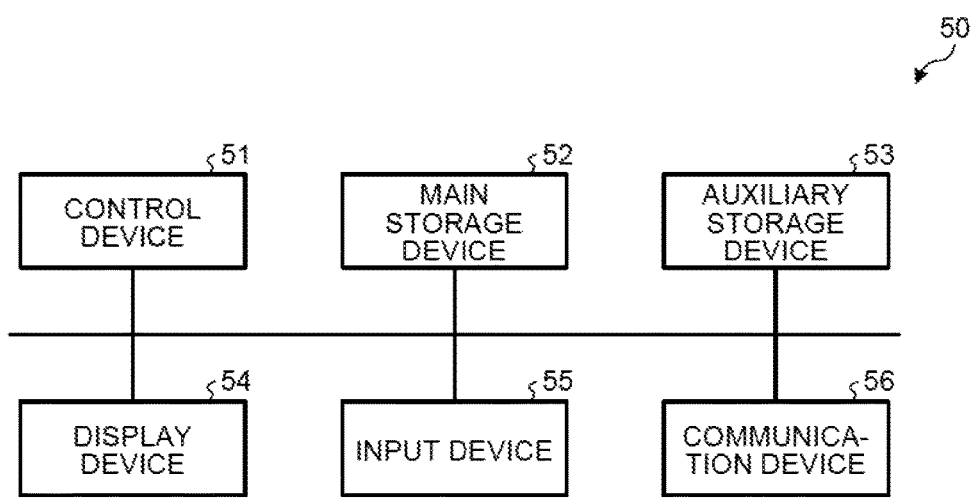
FIG. 6 is a block diagram illustrating an example of a hardware structure of still another device management apparatus according to the present embodiment.

FIG. 6 is a block diagram illustrating an example of a hardware structure of the managed device 50 according to the present embodiment. As illustrated in FIG. 6, the managed device 50 includes a control device 51 such as a CPU and a GPU, a main storage device 52 such as a ROM and a RAM, an auxiliary storage device 53 such as an HDD or an SSD, a display device 54 such as a display, an input device 55 such as a mouse, a keyboard, or a touch panel, and a communication device 56 such as a communication interface. Hence, the managed device 50 has a hardware structure exploiting a general computer.

The managed device 50 may further include hardware specific to the managed device 50 in addition to the above-described structure. Examples of the hardware include an IC, an ASIC (application specific integrated circuit), and a variety of sensors.

Figure 7:
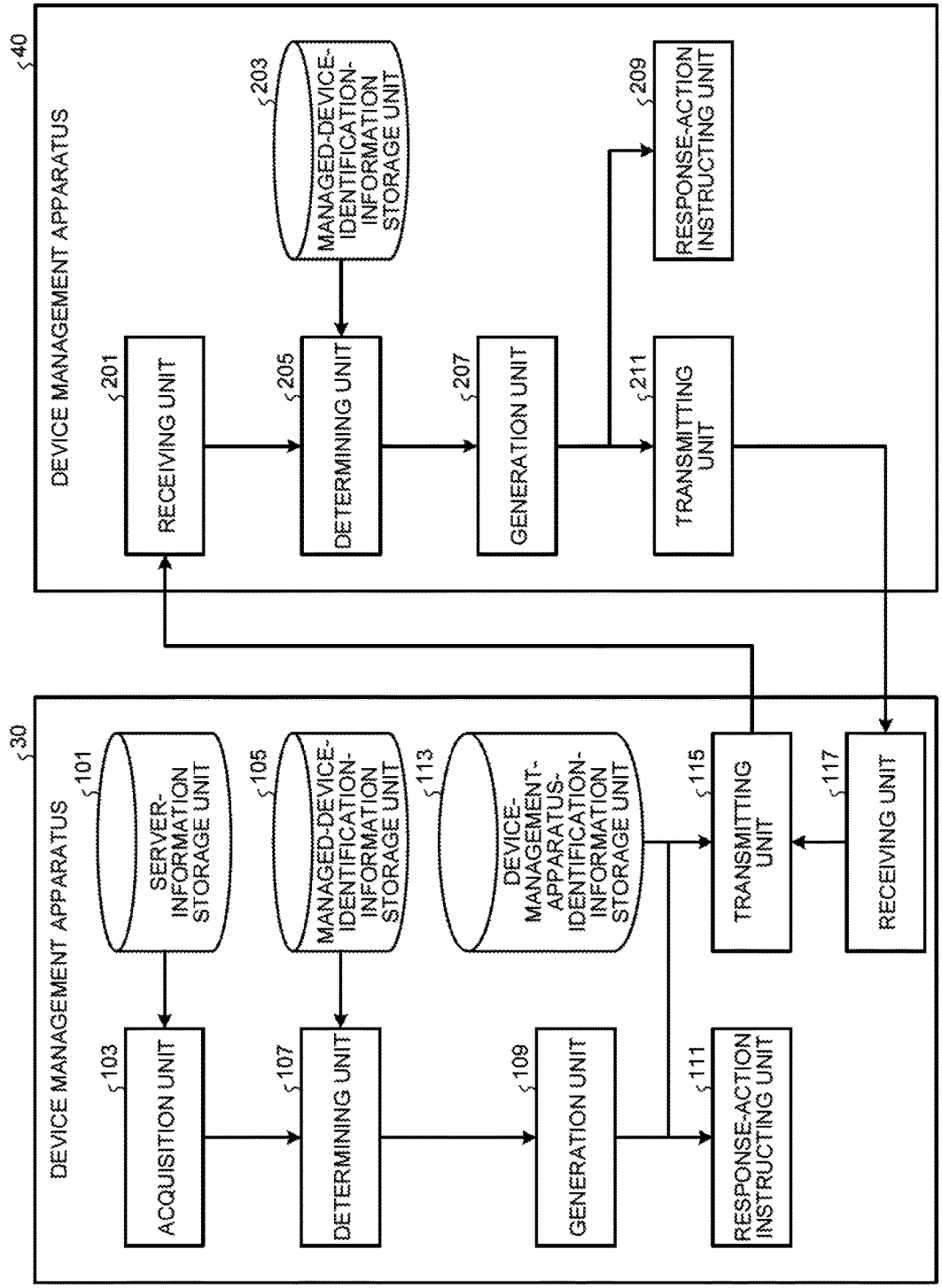
FIG. 7 is a block diagram illustrating an example of a functional configuration of the device management apparatus and the other device management apparatus according to the present embodiment.

FIG. 7 is a block diagram illustrating an example of a functional configuration of the device management apparatus 30 and the device management apparatus 40 according to the present embodiment. As illustrated in FIG. 7, the device management apparatus 30 includes a server-information storage unit 101, an acquisition unit 103, a managed-device-identification-information storage unit 105, a determining unit 107, a generation unit 109, a response-action instructing unit 111, a device-management-apparatus-identification-information storage unit 113, a transmitting unit 115, and a receiving unit 117.

The server-information storage unit 101, the managed-device-identification-information storage unit 105, and the device-management-apparatus-identification-information storage unit 113 can be implemented on, for example, at least any one of the main storage device 32 and the auxiliary storage device 33. The acquisition unit 103, the response-action instructing unit 111, the transmitting unit 115, and the receiving unit 117 can be implemented on, for example, the control device 31, the main storage device 32, and the communication device 36. The determining unit 107 and the generation unit 109 can be implemented on, for example, the control device 31 and the main storage device 32.

As illustrated in FIG. 7, the device management apparatus 40 includes a receiving unit 201, a managed-device-identification-information storage unit 203, a determining unit 205, a generation unit 207, a response-action instructing unit 209, and a transmitting unit 211.

The receiving unit 201, the response-action instructing unit 209, and the transmitting unit 211 can be implemented on, for example, the control device 41, the main storage device 42, and the communication device 46. The managed-device-identification-information storage unit 203 can be implemented on, for example, at least any one of the main storage device 42 and the auxiliary storage device 43. The determining unit 205 and the generation unit 207 can be implemented on, for example, the control device 41 and the main storage device 42.

The server-information storage unit 101 stores therein information about the email server 20 to be used by the device management apparatus 30. Examples of the information stored in the server-information storage unit 101 include address information indicating a network address of the email server 20 and authentication information for use by the email server 20 to authenticate the device management apparatus 30. Examples of the address information include an IP address, a port number, and a communication protocol. Examples of the authentication information include an account and a password of an email box provided for the device management apparatus 30.

The acquisition unit 103 acquires an event information record from the email server 20 for each of one or more devices, in each of which an event has occurred. Furthermore, after having acquired the one or more event information records from the email server 20, the acquisition unit 103 deletes the one or more event information records from the email server 20.

In the present embodiment, the acquisition unit 103 accesses email server 20 using the information about the email server 20 stored in the server-information storage unit 101 to submit a request for acquisition of an email(s) accumulated in the email box provided for the device management apparatus 30, thereby acquiring the email(s), and submit a deletion request, thereby deleting the email(s) from the email server 20.

The managed-device-identification-information storage unit 105 stores therein managed-device identification information pieces, by which the respective managed devices 50A managed by the device management apparatus 30 are identified. Each of the managed-device identification information pieces may be a device identification information piece of the managed device 50A, for example.

FIG. 8 is a diagram illustrating an example of information stored in the managed-device-identification-information storage unit 105 according to the present embodiment. In the example illustrated in FIG. 8, the managed-device-identification-information storage unit 105 stores therein a device name, an IP address, a port number, and a serial number, which are associated with each other, of each of the managed devices 50A.

The determining unit 107 determines, for each event information record acquired by the acquisition unit 103, whether or not the event information record is an event information record about the managed device 50A managed by the device management apparatus 30. More specifically, the determining unit 107 determines an event information record containing a device identification information piece matching one of the managed-device identification information pieces stored in the managed-device-identification-information storage unit 105 as an event information record about the managed device 50A.

In the present embodiment, for each email acquired by the acquisition unit 103, the determining unit 107 compares a device name mentioned as a part of an event information record in the email against each of the device names (see FIG. 8) stored in the managed-device-identification-information storage unit 105 and, if there is a match, the determining unit 107 determines that the event information record contained in the email is an event information record about the managed device 50A.

The generation unit 109 generates, for each event information record determined by the determining unit 107 as not being an event information record about the managed device 50A managed by the device management apparatus 30, a record of unprocessed-device information by associating a device identification information piece, address information, and response action information contained in the event information record.

FIG. 9 is a diagram illustrating an example of unprocessed-device information according to the present embodiment. In the example illustrated in FIG. 9, a record of the unprocessed-device information (hereinafter, "unprocessed-device information record") is information, in which a device name, an IF address, a port number, and a Servlet name are associated with each other.

Furthermore, the generation unit 109 generates, for each event information record determined by the determining unit 107 as an event information record about the managed device 50A managed by the device management apparatus 30, a record of processing-subject-device information (hereinafter, "processing-subject-device information record") by associating a device identification information piece, address information, and response action information contained in the event information record. The processing-subject-device information record can have a data structure (see FIG. 9, for example) similar to that of the unprocessed-device information record.

The response-action instructing unit 111 instructs the managed device 50A to perform a response action based on the event information record determined by the determining unit 107 as an event information record about the managed device 50A managed by the device management apparatus 30. More specifically, the response-action instructing unit 111 instructs the managed device 50A, which is the device indicated by the device identification information piece contained in the processing-subject-device information record generated by the generation unit 109, to perform a response action indicated by the response action information.

In the present embodiment, the response-action instructing unit 111 calls, to the managed device 50A indicated by the device name contained in the processing-subject-device information record generated by the generation unit 109, a Servlet using the Servlet name associated with the device name by using the IP address and the port number associated with the device name. In response to the call, the control device 51 of the managed device 50A indicated by the device name causes the display device 54 to display a message, which depends on the event.

The device-management-apparatus-identification-information storage unit 113 stores therein, for each of the device management apparatuses 40, a device-management-apparatus identification information record, by which the device management apparatus 40 is identified. The device-management-apparatus identification information record may be a device identification information piece of each of the device management apparatuses 40, for example.

FIG. 10 is a diagram illustrating an example of information stored in the device-management-apparatus-identification-information storage unit 113 according to the present embodiment. In the example illustrated in FIG. 10, the device-management-apparatus-identification-information storage unit 113 stores therein, for each of the device management apparatuses 40, a server name, which is the name of the device management apparatus 40, an IP address, a port number, and a Servlet name. It is possible to cause the device management apparatus 40 to perform processing similar to that performed by the device management apparatus 30 by calling a Servlet using the Servlet name.

The transmitting unit 115 transmits information, which is based on an event information record determined by the determining unit 107 as not being an event information record about the managed device 50A managed by the device management apparatus 30, to the device management apparatus 40. More specifically, the transmitting unit 115 transmits unprocessed-device information generated by the generation unit 109 to the device, management apparatus 40. When described in more detail, the transmitting unit 115 transmits the unprocessed-device information generated by the generation unit 109 to the device management apparatus 40 indicated by one of device-management-apparatus identification information records stored in the device-management-apparatus-identification-information storage unit 113.

In the present embodiment, the transmitting unit 115 transmits the unprocessed-device information generated by the generation unit 109 to the device management apparatus 40 in the first one of the records stored in the device-management-apparatus-identification-information storage unit 113. However, the method of transmitting the unprocessed-device information is not limited thereto.

More specifically, the transmitting unit 115 transmits the unprocessed-device information (see FIG. 5) generated by the generation unit 109 to the device management apparatus 40 indicated by a server name in the first one of the records stored in the device-management-apparatus-identification-information storage unit 113 using an IP address and a port number associated with the server name, and calls a Servlet using a Servlet name associated with the server name. In response to the call, the device management apparatus 40 indicated by the server name performs processing, which is similar to that performed by the device management apparatus 30, on the transmitted unprocessed-device information.

A configuration of the device management apparatus 40 is described below. Although the configuration is described by way of an example of the device management apparatus 40-1 the device management apparatus 40-2 has a similar configuration.

The receiving unit 201 receives information about a response action to be taken for an event occurred in a device from the device management apparatus 30. More specifically, the receiving unit 201 receives unprocessed-device information from the device management apparatus 30.

The managed-device-identification-information storage unit 203 stores therein managed-device identification information pieces, by which the respective managed devices 50B managed by the device management apparatus 40-1 are identified. Each managed-device identification information piece may be a device identification information piece of the corresponding managed device 50B, for example. The information stored in the managed-device-identification-information storage unit 203 can have a data structure (see FIG. 8, for example) similar to that of the information stored in the managed-device-identification-information storage unit 105.

In the case of the device management apparatus 40-2, the managed-device-identification-information storage unit 203 stores therein managed-device identification information pieces, by which the respective managed devices 50C are identified.

The determining unit 205 determines whether or not the information received by the receiving unit 201 contains information about the managed device 50B. More specifically, the determining unit 205 determines, for each of device identification information pieces contained in the unprocessed-device information received by the receiving unit 201, whether or not the device identification information piece matches one of the managed-device identification information pieces stored in the managed-device-identification-information storage unit 203.

In the present embodiment, the determining unit 205 compares, for each of device names contained in the unprocessed-device information received by the receiving unit 201, the device name against each of device names stored in the managed-device-identification-information storage unit 203 and, if there is a match, the determining unit 107 determines that an unprocessed-device information record containing the device name is an event information record about the managed device 50B.

In the case of the device management apparatus 40-2, the determining unit 205 compares, for each of device names contained in unprocessed-device information received by the receiving unit 201, the device name against each of device names stored in the managed-device-identification-information storage unit 203 and, if there is a match, the determining unit 205 determines that an unprocessed-device information record containing the device name is an event information record about the managed device 50C.

The generation unit 207 generates a processing-subject-device information record by extracting the device identification information piece determined by the determining unit 205 as matching the managed-device identification information piece, and address information and response action information associated with the device identification information piece.

In the present embodiment, the generation unit 207 generates a processing-subject-device information record by extracting an unprocessed-device information record containing a device name determined by the determining unit 205 as matching one of the device names stored in the managed-device-identification-information storage unit 203. The processing-subject-device information record can have a data structure similar to that of the processing-subject-device information record generated by the device management apparatus 30.

The generation unit 207 generates new unprocessed-device information by extracting a device identification information piece(s) determined by the determining unit 205 as matching none of the managed-device identification information pieces, and address information and response action information associated with the device identification information piece(s) and updates the unprocessed-device information received by the receiving unit 201.

In the present embodiment, the generation unit 207 generates new unprocessed-device information by extracting an unprocessed-device information record(s) each containing a device name determined by the determining unit 205 as matching none of the device names stored in the managed-device-identification-information storage unit 203. The new unprocessed-device information can have a data structure similar to that of the unprocessed-device information received by the receiving unit 201.

Figures 11, 12:
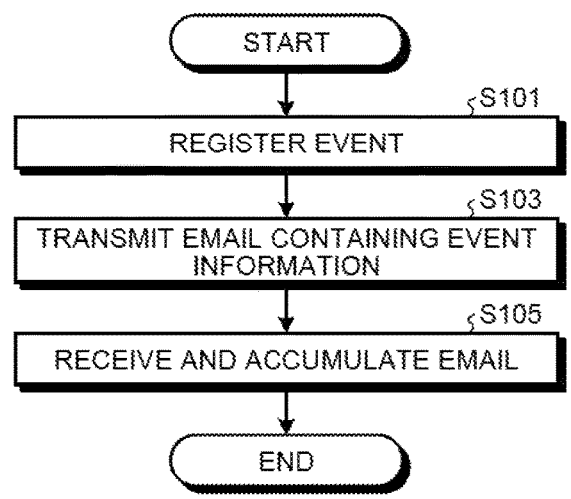
FIG. 11 is a diagram illustrating an example of updated unprocessed-device information according to the present embodiment.
FIG. 12 is a flowchart illustrating an example of processing executed by the help desk system and the email server according to the present embodiment.

For example, if each of DEVICE 4 and DEVICE 5 in the unprocessed-device information illustrated in FIG. 9 is determined by the determining unit 205 as matching none of the device names stored in the managed-device-identification-information storage unit 203, the generation unit 207 extracts records of DEVICE 4 and DEVICE 5, thereby generating new unprocessed-device information (see FIG. 11), and updates the unprocessed-device information illustrated in FIG. 9 to the unprocessed-device information illustrated in FIG. 11.

When the determining unit 205 determines that information about the managed device 50B is contained in the information received by the receiving unit 201, the response-action instructing unit 209 instructs the managed device 50B to perform a response action based on the information. More specifically, the response-action instructing unit 209 instructs the managed device 50R, which is the device indicated by the device identification information piece contained in the processing-subject device information generated by the generation unit 207, to perform a response action indicated by the response action information associated with the device identification information piece.

In the present embodiment, the response-action instructing unit 209 calls, to the managed device 50B indicated by the device name contained in the processing-subject-device information generated by the generation unit 207, a Servlet using a Servlet name associated with the device name using an IP address and a port number associated with the device name. In response to the call, the control device 51 of the managed device 50B indicated by the device name causes the display device 54 to display a message, which depends on the event.

In the case of the device management apparatus 40-2, the response-action instructing unit 209 calls, to the managed device 50C indicated by a device name contained in processing-subject-device information generated by the generation unit 207, a Servlet using a Servlet name associated with the device name using an IP address and a port number associated with the device name. In response to the call, the control device 51 of the managed device 50C indicated by the device name causes the display device 54 to display a message, which depends on the event.

When the unprocessed-device information is updated by the generation unit 207, the transmitting unit 211 transmits the updated unprocessed-device information to the device management apparatus 30.

A further description about the configuration of the device management apparatus 30 is given below.

The receiving unit 117 receives, from the device management apparatus 40, unprocessed-device information, which is generated by deleting response action information used by the device management apparatus 40 in instructing to perform a response action(s), and device identification information piece(s) and address information associated with the response action information from unprocessed-device information transmitted from the device management apparatus 30.

For example, the receiving unit 117 may receive the unprocessed-device information illustrated in FIG. 11 from the device management apparatus 40.

When the unprocessed-device information is received by the receiving unit 117, the transmitting unit 115 transmits the unprocessed-device information to another, than the device management apparatus 40, to which unprocessed-device information has been transmitted, of the device management apparatuses 40. More specifically, the transmitting unit 115 transmits the unprocessed-device information received by the receiving unit 117 to the device management apparatus 40 indicated by one of the device-management-apparatus identification information records stored in the device-management-apparatus-identification-information storage unit 113 but not used in transmission of unprocessed-device information yet.

In the present embodiment, the transmitting unit 115 transmits unprocessed-device information received by the receiving unit 117 to the device management apparatus 40 mentioned in a record next to a record, in which the device management apparatus 40, to which immediately previous unprocessed-device information has been transmitted, is mentioned, of the records stored in the device-management-apparatus-identification-information storage unit 113. However, the method of transmitting the unprocessed-device information is not limited thereto.

For example, if the transmitting unit 115 has transmitted immediately previous unprocessed-device information to one (e.g., the device management apparatus 40-1) of the device management apparatuses 40 mentioned in the first one of the records stored in the device-management-apparatus-identification-information storage unit 113, the transmitting unit 115 transmits presently-processed unprocessed-device information to another (e.g., the device management apparatus 40-2) of the device management apparatuses 40 mentioned in the second one of the records.

FIG. 12 is a flowchart illustrating an example of processing executed by the help desk system 10 and the email server 20 according to the present embodiment.

When event information is registered by an operator of the help desk system 10 or the like (step S101), the help desk system 10 transmits an email containing content of the registered event information to the email server 20 (step S103).

Thereafter, the email server 20 receives the email from the help desk system 10 and accumulates (stores) the received email (step S105).

Figure 13:
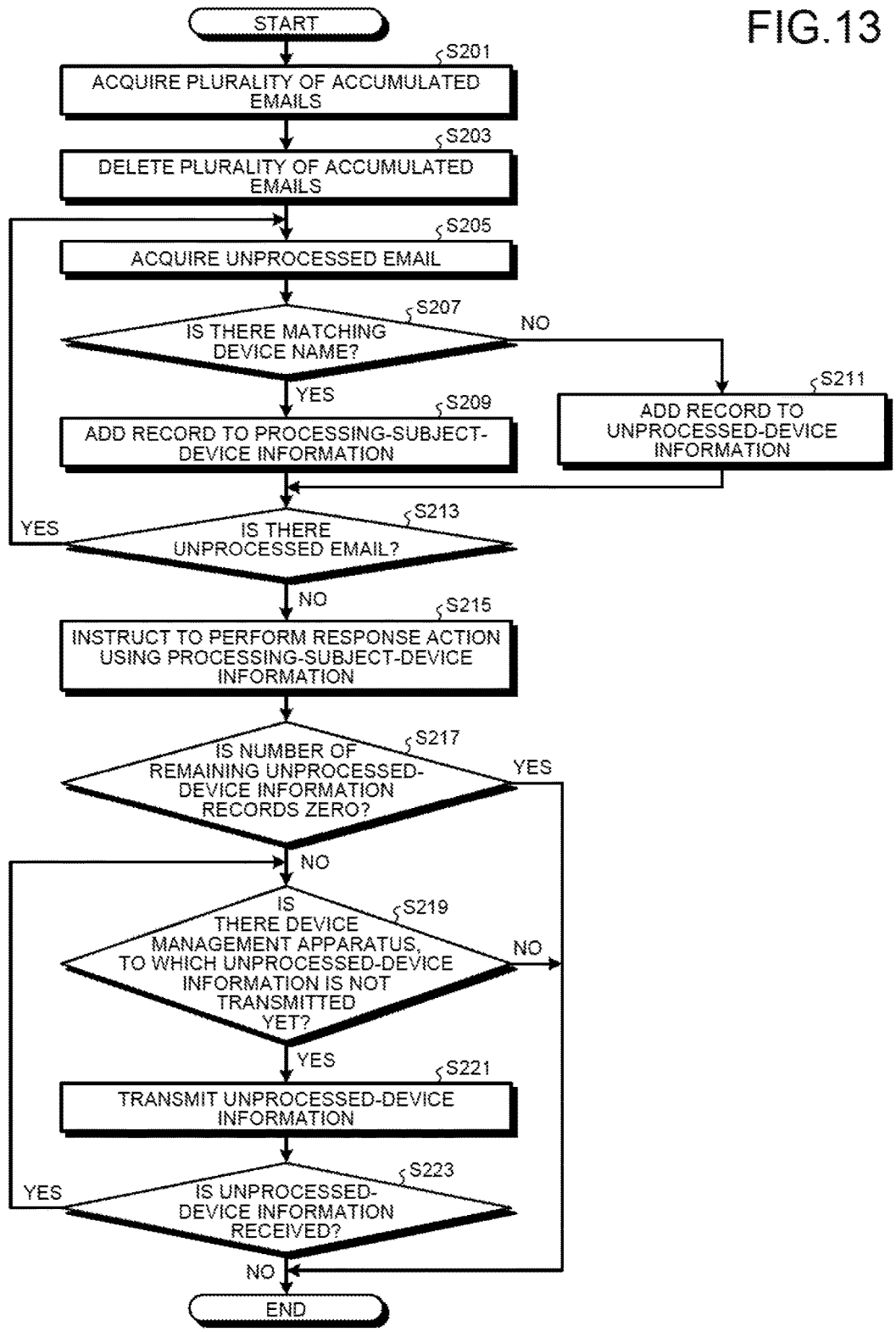
FIG. 13 is a flowchart illustrating an example of processing executed by the device management apparatus according to the present embodiment.

FIG. 13 is a flowchart illustrating an example of processing executed by the device management apparatus 30 according to the present embodiment.

The acquisition unit 103 submits a request for acquisition of an email(s) accumulated in the email box provided for the device management apparatus 30 by accessing the email server 20 by using information stored in the server-information storage unit 101, thereby acquiring the email(s) (step S201) and submits a deletion request, thereby deleting the email(s) from the email server 20 (step S203).

Thereafter, the determining unit 107 acquires an unprocessed email from the email(s) acquired by the acquisition unit 103 (step S205) and determines whether or not a device name mentioned in the email as a part of an event information record matches one of the device names stored in the managed-device-identification-information storage unit 105 (step S207).

If there is a match (Yes at step S207), the generation unit 109 associates the device name, an IP address, a port number, and a Servlet name contained in the event information record of the email with each other, thereby adding a record to processing-subject-device information (step S209).

On the other hand, if there is no match (No at step S207), the generation unit 109 associates the device name, the IP address, the port number, and the Servlet name contained in the event information record of the email with each other, thereby adding a record to unprocessed-device information (step S211).

So long as there is an email not processed yet in the email(s) acquired by the acquisition unit 103 (Yes at step S213), the processes from steps S205 to S211 are repeated. Through the processes, the processing-subject-device information and the unprocessed-device information are generated (completed).

Thereafter, if there is not unprocessed email any more in the email(s) acquired by the acquisition unit 103 (No at step S213), the response-action instructing unit 111 calls, to the managed device 50A indicated by the device name contained in the processing-subject-device information generated by the generation unit 109, a Servlet using the Servlet name associated with the device name using the IP address and the port number associated with the device name, thereby instructing the managed device 50A to perform a response action (step S215). In response to the instruction, the managed device 50A indicated by the device name displays a message, which depends on an event.

Thereafter, if the number of remaining unprocessed-device information records generated by the generation unit 109 is not zero (No at step S217) and if there is a record about the device management apparatus 40, to which unprocessed-device information is not transmitted yet, in the device-management-apparatus-identification-information storage unit 113 (Yes at step S219), the transmitting unit 115 transmits, to the device management apparatus 40 indicated by a server name of the record, the unprocessed-device information generated by the generation unit 109 by using an IP address and a port number associated with the server name, and calls a Servlet using the Servlet name associated with the server name (step S221). In response to the call, the device management apparatus 40 indicated by the server name performs processing, which is similar to that performed by the device management apparatus 30, on the transmitted unprocessed-device information.

If the number of the remaining unprocessed-device information records generated by the generation unit 109 is zero. (Yes at step S217), or if there is no record about the device management apparatus 40, to which unprocessed-device information is not transmitted yet, in the device-management-apparatus-identification-information storage unit 113 (NO at step S219), processing ends.

Thereafter, if the receiving unit 117 receives unprocessed-device information from the device management apparatus 40, to which the unprocessed-device information generated by the generation unit 109 has been transmitted at step S221 (Yes at step S223), processing returns to step S219.

If the receiving unit 117 does not receive unprocessed-device information from the device management apparatus 40, to which the unprocessed-device information generated by the generation unit 109 has been transmitted at step S221, but receives a processing completion notice or the like (No at step S223), processing ends.

Figure 14:
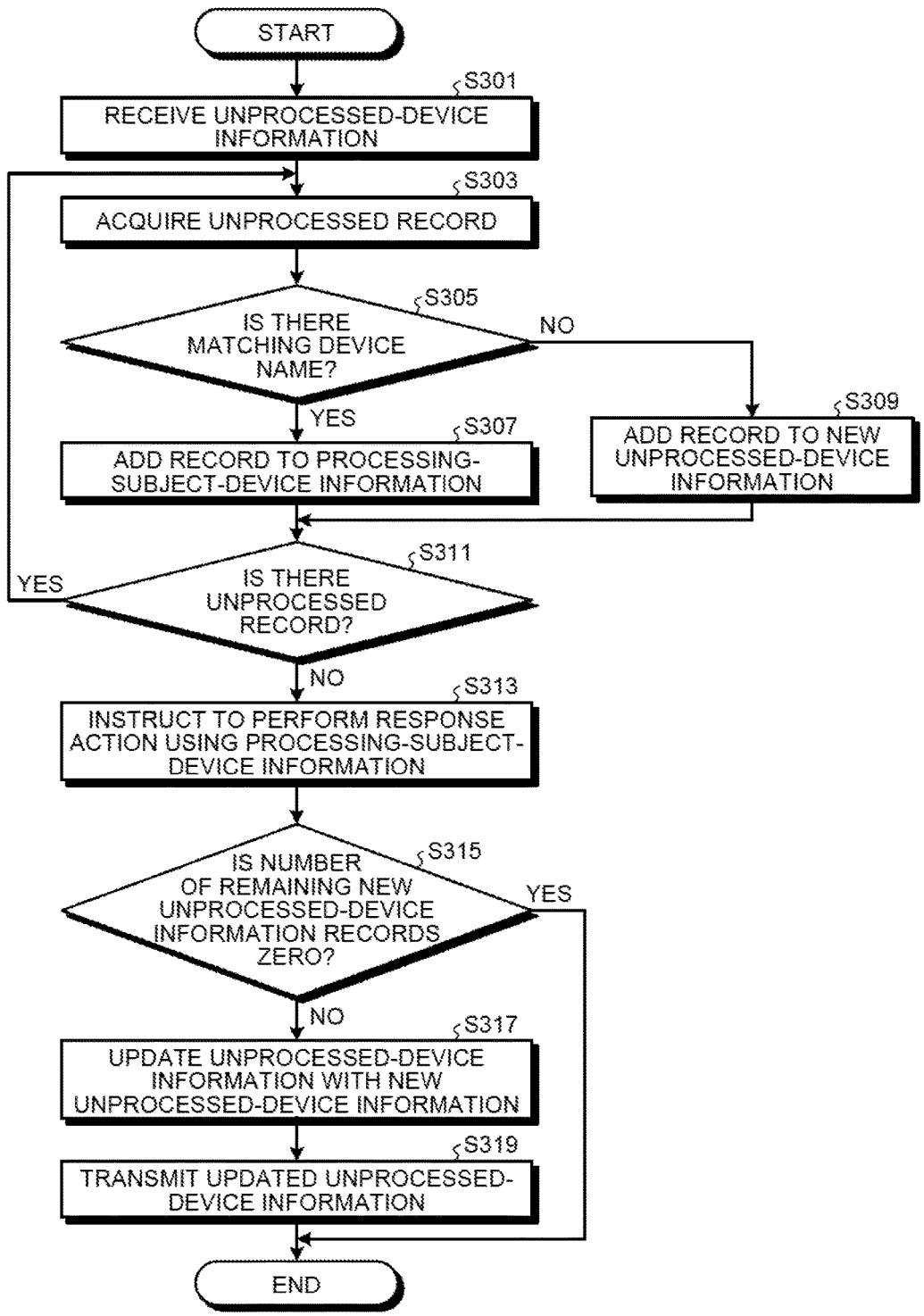
FIG. 14 is a flowchart illustrating an example of processing executed by the other device management apparatus according to the present embodiment.

FIG. 14 is a flowchart illustrating an example of processing executed by the device management apparatus 40 according to the present embodiment.

The receiving unit 201 receives unprocessed-device information from the device management apparatus 30 (step S301).

Thereafter, the determining unit 205 acquires an unprocessed record from the unprocessed-device information received by the receiving unit 201 (step S303) and determines whether or not a device name contained in the record matches one of the device names stored in the managed-device-identification-information storage unit 203 (step S305).

If there is a match (Yes at step S305), the generation unit 207 adds the record to processing-subject-device information (step S307).

On the other hand, if there is no match (No at step. S305), the generation unit 207 adds the record to new unprocessed-device information (step S309).

So long as there is a record not processed yet in the unprocessed-device information received by the receiving unit 201 (Yes at step S311), the processes from S303 to S309 are repeated. Through the processes, the processed-device information and the new unprocessed-device information are generated (completed).

Thereafter, if there is not unprocessed record any more in the unprocessed-device information received by the receiving unit 201 (No at step S311), the response-action instructing unit 209 calls, to the managed device indicated by the device name contained in the processing-subject-device information generated by the generation unit 207, a Servlet using a Servlet name associated with the device name using an IP address and a port number associated with the device name, thereby instructing the managed device to perform a response action (step S313). In response to the instruction, the managed device indicated by the device name displays a message, which depends on an event.

Thereafter, if the number of remaining new unprocessed-device information records generated by the generation unit 207 is not zero (No at step S315), the transmitting unit 211 updates the unprocessed-device information received by the receiving unit 201 with the new unprocessed-device information generated by the generation unit 207 (step S317), and transmits the updated unprocessed-device information to the device management apparatus 30 (step S319).

If the number of the remaining new unprocessed-device information records generated by the generation unit 207 is zero (Yes at step S315), the transmitting unit 211 transmits a processing completion notice to the device management apparatus 30. Then, processing ends.

As described above, according to the present embodiment, a device management apparatus functioning as a master acquires an email(s) from an email server. An event information record(s) other than an event information record(s) about a managed device(s) managed by the device management apparatus is transmitted to one or more device management apparatuses, each functioning as a slave, in a sequential order. Accordingly, even if there is a plurality of device management apparatuses managing different managed devices, it is possible to cause the managed devices to respectively perform response actions, each based on a corresponding one of event information records managed externally.

Program instructions (hereinafter, "programs") to be executed by each of the help desk system, the email server, the device management apparatuses, and the managed devices according to the present embodiment (hereinafter, "the devices of the embodiment") may be provided as being recorded in a non-transitory computer-readable recording medium such as a CD-ROM, a CD-R, a memory card, a DVD (digital versatile disk), or an FD (flexible disk) as an installable file or an executable file.

The programs to be executed by the devices of the embodiment may be configured to be stored in a computer connected to a network such as the Internet and provided by being downloaded via the network. The programs to be executed by the devices of the embodiment may be configured to be provided or distributed via a network such as the Internet. The programs to be executed by the devices of the embodiment may be provided as being installed on a ROM or the like in advance.

The programs to be executed by the devices of the embodiment are configured in modules for implementing the units described above on a computer. From an actual hardware perspective, the functional units described above may be implemented on the computer by a CPU by loading the programs from a ROM into a RAM and executing the programs, for example.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management apparatus including a processor and a non-transitory computer readable medium storing one or more programs executable by the processor to configure the device management apparatus to perform a method comprising:

(a1) registering, in a storage device of the device management apparatus and for each managed device amongst one or more managed devices managed by the device management apparatus, a managed-device identification information record associating one or more managed device identification information pieces with the managed device;

(a2) registering, in the storage device and for each other management apparatus, amongst one or more other management apparatuses, managing at least one device which is not managed by the device management apparatus, a management apparatus identification information record associating one or more apparatus identification information pieces with said other device management apparatus;

(a) acquiring, by the device management apparatus from an external apparatus, a status-change information record for a status change that occurred in a status-changed device, the status-change information record including a device identification information piece identifying the status-changed device in which the status change occurred, address information indicating an address of the status-changed device, and response action information indicating a response action to be caused to be performed on the status-changed device, wherein the response action comprises a name of a servlet which when executed by the status-changed device causes the status-changed device to perform a predetermined action;

(b) determining, by the device management apparatus, whether or not the acquired status change information record for the status-changed device is a status-change information record for a first managed device amongst the managed devices managed by the device management apparatus, based on whether the device identification information piece contained in the acquired status-change information record corresponds to a managed-device identification information piece registered for the first managed device;

(c) transmitting an instruction by the device management apparatus to the first managed device, if the device identification information piece contained in the acquired status-change information record for the status-changed device acquired by the device management apparatus is determined in (b) as corresponding to the managed-device identification information piece registered for the first managed device, to instruct the first managed device to perform a first response action associated with the response action information in the status-change information record; and (d) transmitting, by the device management apparatus, first unprocessed-device information generated by the device management apparatus based on the acquired status-change information record for the status-changed device, to another management apparatus, amongst said one or more other management apparatuses, indicated • by an apparatus identification information piece registered in association with said another management apparatus and managing a second device which is not a managed device amongst the managed devices managed by the device management apparatus, if it is determined in (b) that the device identification information piece contained in the acquired status-change information record for the status-changed device does not correspond to any of the managed-device identification information pieces registered for the managed devices managed by the device management apparatus.

2. The device management apparatus according to claim 1, wherein the status-change information record acquired in (a) further contains content information indicating description of the status change, and wherein the method performed by the device management apparatus further comprises:

(c1) generating the first unprocessed-device information by associating the device identification information piece, the address information, and the response action information contained in the acquired status-change information record determined not to correspond to any of managed devices managed by device management apparatus, before the first unprocessed-device information is transmitted to said another device management apparatus in (d).

3. The device management apparatus according to claim 2, wherein the first unprocessed-device information further includes second response action information, a second device identification information piece and second address information, and the method performed by the device management apparatus further comprises:

(e1) receiving from said another management apparatus to which the first unprocessed-device information has been transmitted in (d), additional unprocessed-device information, generated by said another management apparatus by deleting (i) the second response action information used by said another device management apparatus in instructing to perform a response action, and (ii) the second device identification information piece and (iii) the second address information associated with the second response action information, from the unprocessed-device information transmitted in (d), and (e2) transmitting, after the additional unprocessed-device information is received in (e1), the generated additional unprocessed-device information to an additional device management apparatus different from the device management apparatus and said another management apparatus.

4. The device management apparatus according to claim 3, wherein the method performed by the device management apparatus further comprises:

transmitting the additional unprocessed-device information to said additional device management apparatus indicated by a second device-management-apparatus identification information record registered in the storage device.

5. The device management apparatus according to claim 2, wherein the method performed by the device management apparatus further comprises:

generating processing-subject-device information by associating the device identification information piece, the address information, and the response action information contained in a status-change information record determined to be for the first managed device, and instructing the first managed device indicated by the device identification information piece contained in the processing-subject-device information record to perform the response action indicated by the response action information.

6. The device management apparatus according to claim 1, wherein the method performed by the device management apparatus further comprises, after having acquired the status-change information record from the external apparatus, deleting the status-change information record acquired from the external apparatus.

7. The device management apparatus according to claim 1, the first unprocessed-device information further includes a second device identification information piece, second address information and second response action information, and the method performed by the device management apparatus further comprises:

(e) receiving, by the device management apparatus from said another management apparatus to which the first unprocessed-device information has been transmitted, additional unprocessed-device information generated by deleting, from the first unprocessed-device information, the second device identification information piece, the second address information, and the second response action information used by said another device management apparatus in instructing the second device to perform a second response action; and (f) transmitting, by the device management apparatus when the additional unprocessed device information is received in (e), the additional unprocessed-device information to an additional device management apparatus which manages a third device to which neither the first unprocessed-device information nor the additional unprocessed-device information has been transmitted, said additional device management apparatus being different from the device management apparatus and said another management apparatus.

8. A device management apparatus including a processor and non-transitory computer readable medium storing one or more programs executable by the processor to configure the device management apparatus to perform a method comprising:
(a1) registering, in a storage device of the device management apparatus and for each managed device amongst one or more managed devices managed by the device management apparatus, a managed-device identification information record associating one or more managed-device identification information pieces with the managed device;
(a2) registering, in the storage device and for each other management apparatus, amongst one or more other management apparatuses, managing at least one device which is not managed by the device management apparatus, a management apparatus identification information record associating one or more apparatus identification information pieces associated with the other device management apparatuses;
(a) receiving, by the device management apparatus from another management apparatus, amongst said one or more other management apparatuses indicated by an apparatus identification information piece registered in association with said another management apparatus and managing a second managed device that is different from a first managed device amongst the managed devices managed by the device management apparatus, unprocessed-device information based on a status-change information record for a status change that occurred in a status-changed device other than the second managed device managed by said another device management apparatus, the status-change information record including a device identification information piece identifying the status-changed device in which the status change occurred, address information indicating an address of the status-changed device in which the status change occurred, and response action information indicating a response action to be performed in or on the status-changed device in which the status change occurred, wherein the response action comprises a name of a servlet which when executed by the status-changed device causes the status-changed device to perform a predetermined action;
(b1) determining, by the device management apparatus, whether or not the received unprocessed-device information contains information for the first managed device managed by the device management apparatus, based on whether the device identification information piece contained in the status-change information record corresponds to a managed-device identification information piece registered for the first managed device; and
(c1) transmitting an instruction by the device management apparatus to the first managed device, if the received unprocessed-device information contains information for the first managed device, to cause the first managed device to perform a response action indicated by the response action information in the status-change information record corresponding to the received unprocessed-device information containing the information for the first managed device.

9. The device management apparatus according to claim 8, wherein the method performed by the device management apparatus further comprises:
generating a processing-subject-device information record by extracting a device identification information piece amongst one or more device identification information pieces determined to correspond to the managed-device identification information pieces registered for one of the managed devices managed by the device management apparatus, and address information amongst said at least one address information associated with the device identification information piece determined to correspond to the managed-device identification information pieces, and response action information amongst said at least one first response action information associated with the device identification information piece determined to match the managed-device identification information piece, and
instructing the managed device indicated by the device identification information piece contained in the processing-subject-device information record to perform the response action indicated by the response action information associated with the device identification information piece contained in the processing-subject-device information.

10. The device management apparatus according to claim 9, further comprising:
generating new unprocessed-device information by extracting a device identification information piece amongst at least one first device identification information piece determined not to match the managed-device identification information piece, and address information amongst said at least one first address information and response action information amongst said at least one response action information associated with the device identification information piece determined not to match the managed-device identification information piece, and updates updating the unprocessed-device information received in (a), with the generated new unprocessed-device information, and
transmitting, when the unprocessed-device information is updated, the updated unprocessed-device information to said another device management apparatus.

11. The device management apparatus according to claim 8, further comprising:
transmitting, by the device management apparatus to said another device management apparatus, new unprocessed-device information generated by deleting, from the unprocessed device information, response action information used by the device management apparatus in instructing the first managed device to perform the response action, to cause said another device management apparatus to transmit in turn the new unprocessed-device information to an additional device management apparatus which manages a third managed device and to which neither the unprocessed-device information nor the new unprocessed-device information has been transmitted, said additional device management apparatus being different from the device management apparatus and said another management apparatus.

* * * * *